United States Patent
Berg (10) Patent No.: US 9,651,023 B2
(45) Date of Patent: May 16, 2017

(54) WIND TURBINE BLADE COMPRISING ROOT END BULKHEAD

(75) Inventor: Kore Bjarke Berg, Esbjerg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 760 days.

(21) Appl. No.: 14/003,523

(22) PCT Filed: Mar. 2, 2012

(86) PCT No.: PCT/EP2012/053601
§ 371 (c)(1),
(2), (4) Date: Sep. 6, 2013

(87) PCT Pub. No.: WO2012/119934
PCT Pub. Date: Sep. 13, 2012

(65) Prior Publication Data
US 2013/0336789 A1    Dec. 19, 2013

(30) Foreign Application Priority Data
Mar. 8, 2011   (EP) .................................. 11157298

(51) Int. Cl.
*F03D 1/06* (2006.01)
(52) U.S. Cl.
CPC ........... F03D 1/0675 (2013.01); F03D 1/065 (2013.01); *F05B 2250/141* (2013.01); *Y02E 10/721* (2013.01); *Y10T 29/49336* (2015.01)
(58) Field of Classification Search
CPC ....................... F05B 2240/57; F05B 2250/141
See application file for complete search history.

(56) References Cited

U.S. PATENT DOCUMENTS 5,062,589 A * 11/1991 Roth .................... B64C 1/10
                                                  244/117 R
5,149,739 A * 9/1992 Lee ...................... C08L 75/04
                                                  524/504
(Continued)

FOREIGN PATENT DOCUMENTS

EP     0387400 A2    9/1990
FR     2863319        6/2005
(Continued)

OTHER PUBLICATIONS

Archived website: Wikipedia article from May 2, 2009, Fibre-reinforced plastic.*
(Continued)

*Primary Examiner* — Craig Kim
*Assistant Examiner* — Jason Davis
(74) *Attorney, Agent, or Firm* — Nath, Goldberg & Meyer; Jerald L. Meyer; Tanya E. Harkins (57) ABSTRACT

A wind turbine blade (10) for a rotor of a wind turbine (2) having a substantially horizontal rotor shaft is disclosed. The rotor comprises a hub (8), from which the blade (10) extends substantially in a radial direction when mounted to the hub (8), the blade having a longitudinal direction (r) with a tip end (16) and a root end (14) and a transverse direction. The wind turbine blade comprises a blade shell defining a profiled contour of the blade and having an inner shell wall, wherein the blade is provided with a bulkhead mounted to the inner shell wall at the root end of the blade via an attachment part, the bulkhead comprising a first side and a second side. The attachment part is integrally formed with or connected to the bulkhead, and the attachment part comprises an elastomeric material.

42 Claims, 5 Drawing Sheets

(56) References Cited

U.S. PATENT DOCUMENTS

| | | | | |
|---|---|---|---|---|
| 5,476,704 A | * | 12/1995 | Kohler | B29C 66/721 |
| | | | | 244/119 |
| 8,985,515 B2 | * | 3/2015 | McCullough | B29D 99/001 |
| | | | | 244/131 |
| 2004/0011927 A1 | * | 1/2004 | Christman | B29C 65/00 |
| | | | | 244/131 |
| 2007/0156117 A1 | * | 7/2007 | Adams | A61J 15/0015 |
| | | | | 604/533 |
| 2010/0285297 A1 | * | 11/2010 | Bansal | B29C 70/443 |
| | | | | 428/306.6 |
| 2011/0031759 A1 | | 2/2011 | Mitsuoka et al. | |

FOREIGN PATENT DOCUMENTS

| | | |
|---|---|---|
| GB | 2462308 A | 2/2010 |
| WO | 2009085041 A1 | 7/2009 |
| WO | 2011144971 | 11/2011 |

OTHER PUBLICATIONS

Archived website: Thermal Tech Equipment Co from Jun. 4, 2006, Shore Durometer Conversion Chart.*

* cited by examiner

I # WIND TURBINE BLADE COMPRISING ROOT END BULKHEAD

This is a National Phase Application filed under 35 U.S.C. 371 as a national stage of PCT/EP2012/053601, filed Mar. 2, 2012, and claims priority from European Application No. 11157298.8, filed Mar. 8, 2011, the content of each of which is hereby incorporated by reference in its entirety.

TECHNICAL FIELD

The present invention relates to a wind turbine blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the wind turbine blade comprising a blade shell defining a profiled contour of the blade and having an inner shell wall, wherein the blade is provided with a bulkhead mounted to the inner shell wall at the root end of the blade via an attachment part, the bulkhead comprising a first side and a second side. The invention also relates to a method of manufacturing a bulkhead and attachment part combination.

BACKGROUND

A modern wind turbine comprises a rotor having a hub and a plurality of wind turbine blades, which extend substantially radially from the hub. The rotor is mounted to a machine housing or a nacelle, which in turn is arranged on top of a tower. The machine housing can yaw so that it can pivot around a vertical shaft in relation to the tower, hereby being able to adjust the rotor to the direction of the wind. The rotor can be put into rotation by the wind, thereby driving one or more generators.

Wind turbine blades are often provided with a bulkhead arranged at a root end of the blade, typically located within the inboard 20% of the blade. The bulkhead has two functions. First of all, it functions as a work platform for workers when having to carry out maintenance or repair inside the blade. Second of all, it prevents internal debris from falling into the machine housing of the blade. Additionally, when mounted expediently, the bulkhead is watertight.

The bulkhead is typically glued directly on to an inner wall of the wind turbine blade. However, a wind turbine blade is subjected to large loads during operation, which causes the inboard part of the blade to ovalise. This in turn entails loads to the glue bonding, and in worst case the bulkhead may be torn loose from the inner blade wall. It is also well-known to mount the bulkhead on a bathtub-shaped flange made of steel or a fibre-reinforced composite material, which allows for small movements of the blade wall relative to the bulkhead. Such a solution is for instance known from WO09/085,041. However, this solution is also encumbered by large loads to the flange and to the glue bonding between the flange and the inner blade wall. Further, the relatively stiff flange makes it difficult and tedious to mount the bulkhead and flange inside the wind turbine blade.

DISCLOSURE OF THE INVENTION

It is an object of the invention to obtain a wind turbine blade, which overcomes or ameliorates at least one of the disadvantages of the prior art or which provides a useful alternative.

According to a first aspect, the invention provides a wind turbine blade provided with a bulkhead, where the attachment part of the bulkhead is integrally formed with or connected to the bulkhead part, and wherein the attachment part comprises an elastomeric material.

The bulkhead together with the attachment part may thus be mounted in the wind turbine blade as a unitary element. The elastomeric attachment part provides easy handling when mounting the bulkhead in the blade, since the material is flexible to a degree that the attachment part may be folded into the opening of the blade root and adhered to the inner wall. At the same time the attachment part still provides excellent strength to carry the bulkhead. Further, the elastomeric material provides enough flexibility to counteract ovalisation of the blade root without the attachment part being torn loose from the blade wall.

According to an advantageous embodiment, the attachment part and the bulkhead together seal the root end of the blade. Thus, the bulkhead together with the attachment part may be mounted in the wind turbine as a unitary element, thus sealing the root end of the blade and consequently preventing debris from entering the machine housing.

Further, this solution is particularly simple for making the bulkhead and attachment part combination watertight.

According to a first embodiment, an outer diameter of the attachment part is equal to or larger than an inner diameter of the inner shell wall. Thus, it is ensured that the elastomeric attachment part is not pre-stressed away from the inner blade wall. At the same time the elastomeric material ensures that the attachment part and bulkhead easily can be mounted within the blade, since the flexible attachment part can be folded into the blade and adhered or otherwise be anchored to the inner blade wall of the blade. The outer diameter of the attachment part may for instance be at least 1 cm, or at least 2 cm larger than the inner diameter. According to an alternative embodiment, the outer diameter of the attachment part is smaller than the inner diameter of the inner shell wall, e.g. at least 1 cm, or 2 cm, or 3 cm, or 4 cm, or 5 cm smaller. Thereby, the bulkhead and attachment part may be inserted more easily into the blade and the elastomeric part of the attachment part ensures that the attachment part can be flexed and attached to the blade wall.

According to one advantageous embodiment, the bulkhead comprises a circumference, and the attachment part comprises a blade wall anchoring part and a bulkhead anchoring part attached to the circumference of the bulkhead. Advantageously, the attachment part is circumferentially attached to the bulkhead so that the two parts together seal the root of the wind turbine blade. Accordingly, the attachment part is connected to the bulkhead along the entire circumference or rim of the bulkhead.

In another advantageous embodiment, the blade wall anchoring part and the bulkhead anchoring part are separated by an intermediate part, such as an intermediate arm. The intermediate part allows for further movement of the bulkhead relative to the inner blade wall or vice versa.

In a first embodiment, the blade wall anchoring part, the bulkhead anchoring part and the bulkhead are arranged substantially in the same plane. Thus, if the attachment part comprises a connection arm, this arm extends substantially normally to the inner shell wall.

According to another embodiment, the blade wall anchoring part and the bulkhead anchoring part are displaced along the longitudinal direction of the blade. Thereby, the attachment part is able to provide strength in the longitudinal direction and thus to carry several hundreds of kilograms, which is necessary in order to be able to carry the bulkhead itself as well as a platform or worker standing on the bulkhead.

The blade wall anchoring part and the bulkhead anchoring part may for instance be displaced at least 5 cm along the longitudinal direction of the blade, or at least 7.5 cm, or at least 10 cm.

According to another embodiment, the bulkhead is displaced at least 2 cm from the inner blade wall, or at least 2.5 cm, or at least 3 cm, or at least 4 cm, or at least 6 cm, when the blade is in a non-ovalised state. Thus, when mounted inside the blade, the blade wall anchoring part and the bulkhead anchoring part are displaced equivalently in a transverse direction of the blade.

By letting the blade wall anchoring part and bulkhead anchoring part being displaced both in the longitudinal direction of the blade and from the inner blade wall, i.e. in a radial direction of the circular cross-section of the root, the elastomeric part of the attachment part is able to take up forces from the ovalisation of the root as well as provide the necessary longitudinal or axial strength to carry the bulkhead and a worker standing on the bulkhead.

According to an advantageous embodiment, the connection arm forms an angle with the inner blade wall, the angle lying in an interval of 10 to 80 degrees, advantageously between 10 and 60 degrees, and more advantageously between 10 and 45 degrees, e.g. around 30 degrees.

In another advantageous embodiment, the connection arm is oriented substantially parallel to the longitudinal direction of the blade.

Advantageously, the attachment part comprises a bulkhead anchoring part comprising a substantially c-shaped or u-shaped part having a first part attached to the first side of the bulkhead and a second part attached to the second side of the bulkhead. The bulkhead anchoring part may further comprise a third part attached to the circumference of the bulkhead. Alternatively, the bulkhead anchoring part may be anchored to the bulkhead with an air gap between the third part of the bulkhead anchoring part and the circumference of the bulkhead.

The attachment part may be anchored to the bulkhead and blade wall in various ways, e.g. by adhesion, moulding integrally or onto the bulkhead, or via fastening means.

In another advantageous embodiment, the bulkhead comprises a circumferential groove and the attachment part is attached to the groove, e.g. via a tongue.

In yet another embodiment, the bulkhead is formed as a sandwich construction, advantageously comprising a first fibre reinforced skin at the first side of the bulkhead, a second fibre reinforced skin at the second side of the bulkhead, and a core material between the first skin and the second skin. Thus, the bulkhead may comprise a first layer of fibre-reinforced material at the first side of the bulkhead and a second layer of fibre-reinforced material at the second side of the bulkhead. The fibres may for instance be glass or carbon fibres. The core material may for instance be made of a polymer material, such as a foamed polymer.

In one advantageous embodiment, the elastomeric material of the attachment part and the polymer material of the bulkhead are compatible, preferably chemically compatible. Thereby, the attachment part may for instance be moulded onto the circumference of the bulkhead and chemically bond and adhere to the core material of the sandwich structure of the bulkhead.

In one embodiment, the elastomeric material and the foamed polymer is a polyurethane based material. The resin of the moulded bulkhead may also be a polyurethane based material. Polyurethane is a very versatile material, where the hardness (or flexibility) easily can be varied in order to for instance provide rigid anchoring parts and core of the sandwich structure, as well as a flexible, elastomeric intermediate part of the attachment part.

In another embodiment, the attachment part comprises a circumferential hollow part between the inner blade wall and the bulkhead. The hollow part may provide the necessary movement of the bulkhead in for instance embodiments, where the two anchoring parts are arranged in the same plane.

In yet another embodiment, the attachment part comprises a circumferential core part. The circumferential core part may for instance be made of a material, which is adapted to pulverise or otherwise break apart when subjected to loads. Thereby, the core will break down during operation of the wind turbine and thus form a circumferential hollow part. The core part is thus only utilised for obtaining a form-stable shape during manufacture (and subsequent mounting) of the attachment part and bulkhead.

According to an advantageous embodiment, the attachment part comprises an elastomeric part and a non-elastomeric part, advantageously both made of polyurethane. The elastomeric part of the blade may for instance be attached to the inner blade wall, and the non-elastomeric part is attached to the bulkhead.

In another advantageous embodiment, the attachment part comprises a gradual transition from an elastomeric material to a non-elastomeric material. The gradual transition may for instance be located in the aforementioned connection arm.

In yet another advantageous embodiment, the attachment part comprises a substantially uniform ring having a thickness of at least 5 cm, or at least 7 cm, or at least 10 cm. The thickness is defined as the distance between the outer diameter and the inner diameter of the uniform ring. The elastomer material of the uniform ring may for example have a durometer value lying in an interval from 10-50 on the Shore A scale, and/or have a density lying in an interval from 100-700 kg/m3.

According to another advantageous embodiment, the elastomeric material has a durometer value lying in an interval from 50-100, or 50-90, or 55-85 on the Shore A scale. These durometer values are particularly suitable for the embodiment comprising an intermediate part between the blade anchoring part and the bulkhead anchoring part. In another advantageous embodiment, the elastomeric material has a durometer value lying in an interval from 10-50, or 12-40, or 15-30 on the Shore D scale.

According to a second aspect, the invention also provides a bulkhead and attachment part combination for a wind turbine blade as described in any of the aforementioned embodiments. Thus, the invention provides a bulkhead for mounting to the inner shell wall at the root end of a wind turbine blade comprising an attachment part which is integrally formed with or connected to the bulkhead, and in that the attachment part comprises an elastomeric material.

According to a third aspect, the invention provides a method of manufacturing a bulkhead and attachment part, wherein the method comprises the steps of: a) manufacturing a bulkhead, b) manufacturing an attachment part, and c) anchoring the attachment part to the bulkhead.

In a first advantageous embodiment, the bulkhead and attachment part are integrally formed. Accordingly, steps a), b) and c) may be carried out simultaneously.

In another advantageous embodiment, the attachment part is moulded on to the bulkhead, e.g. to a circumference of the bulkhead. Thus, step a) can be carried out first and steps b)

and c) simultaneously afterwards. Alternatively, the attachment part may be anchored to the bulkhead by adhesion or the like.

In one embodiment, the bulkhead is first manufactured, e.g. as a plate, then shaped and finally arranged in a mould so as to mould the attachment part on to the bulkhead. The bulkhead may for instance be manufactured as a sandwich construction comprising a core material made of a polymer material. The bulkhead may be made as a large plate and subsequently be cut to the intended shape so as to be able to fit into the root of the blade.

In another embodiment, the elastomeric material of the attachment part and the core material of the bulkhead are compatible, e.g. chemically compatible.

The bulkhead may be provided with a hatch so that a worker may access the blade, when the bulkhead and attachment part are mounted in the blade.

BRIEF DESCRIPTION OF THE DRAWINGS

The invention is explained in detail below with reference to embodiments shown in the drawings, in which.

DETAILED DESCRIPTION OF THE INVENTION

Figure 1:
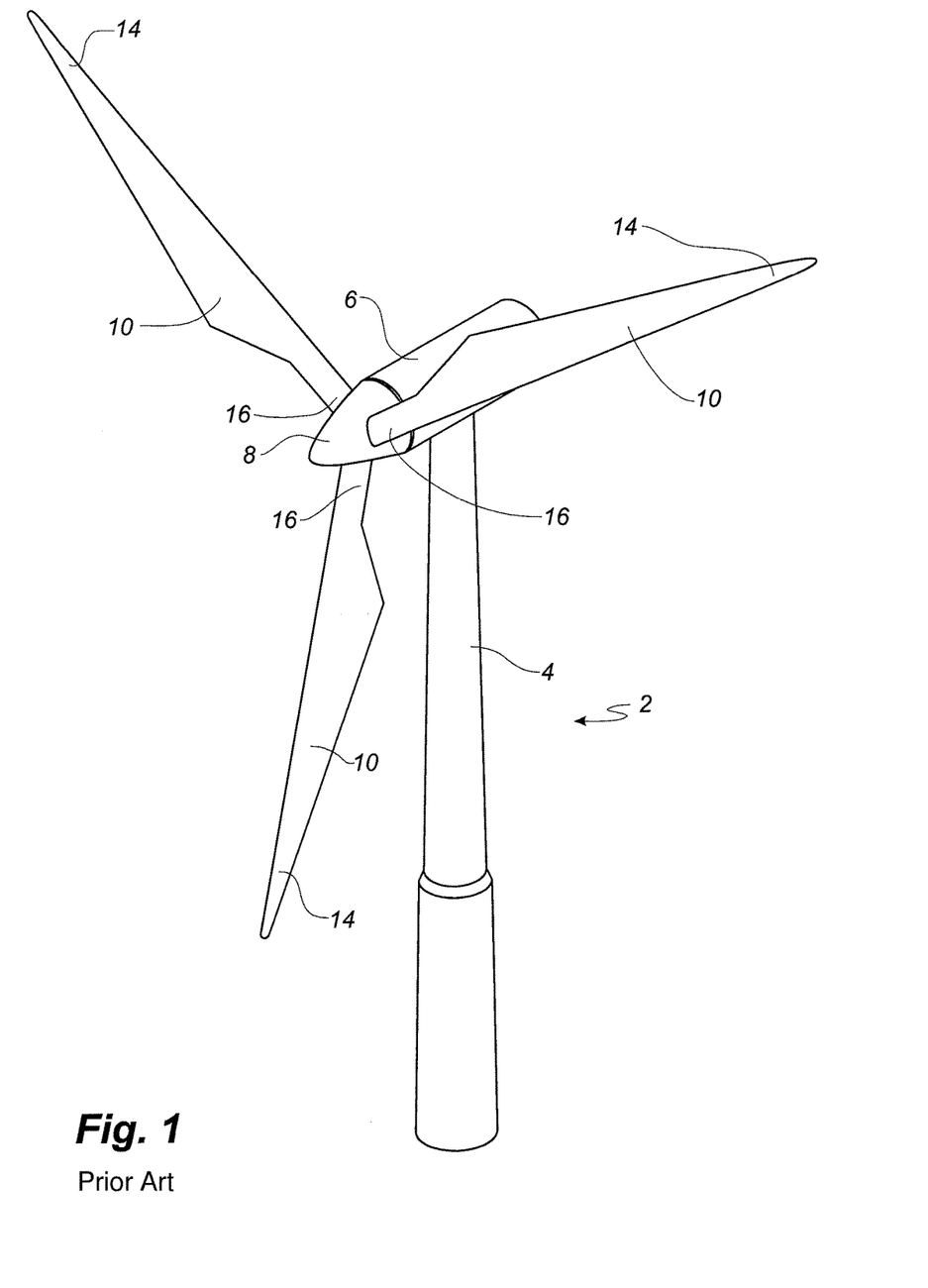
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
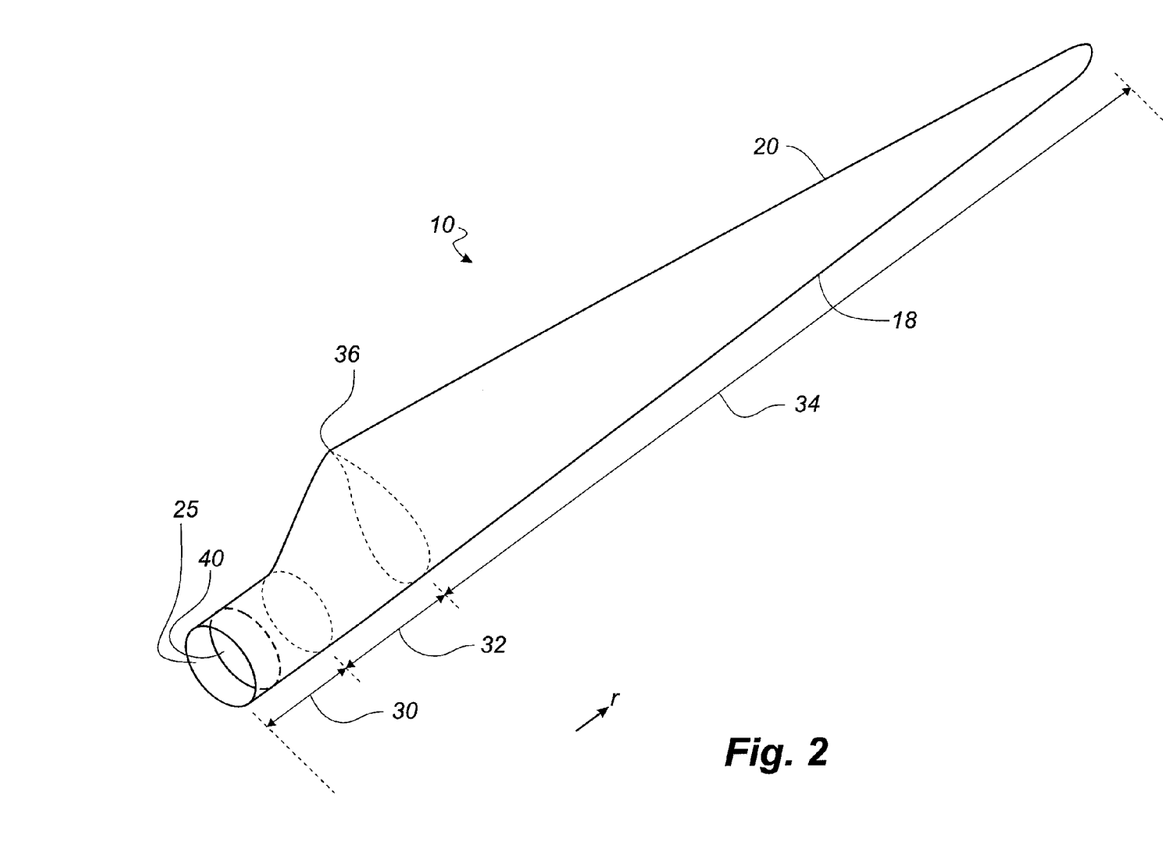
FIG. 2 shows a schematic view of a wind turbine blade according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 36 of the blade 10 is defined as the position, where the blade 10 has its largest chord length. The shoulder 36 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

It can be seen that the blade 10 is also provided with a bulkhead and attachment part combination 40 positioned in the root region 30 of the blade 10 and attached to an inner shell wall 25 of the blade 10. The bulkhead and attachment part combination 40 has two functions. First of all, it keeps internal debris from falling into the machine housing of the blade. Second of all, it functions as a work platform for workers when having to carry out maintenance or repair inside the blade. Therefore, the bulkhead is also provided with a hatch or manhole (not shown), which can be opened so that a worker can gain access to the inside of the blade 10.

Figure 3:
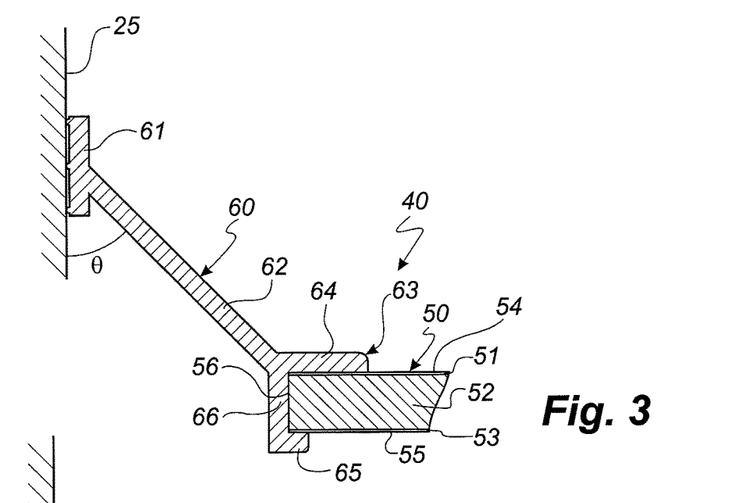
FIGS. 3-17 show various embodiments of bulkhead and attachment part combinations according to the invention.

FIG. 3 shows a partial cross-section of a first embodiment of a bulkhead and attachment part combination 40 according to the invention and comprising a bulkhead 50 and an attachment part 60. The bulkhead 50 is formed as a plate with a sandwich construction and comprises a core material 52 arranged between a first reinforcement skin 51 arranged at a first side 54 of the bulkhead 50 and a second reinforcement skin 53 arranged at a second side 55 of the bulkhead 50. The bulkhead 50 is attached to the inner shell wall 25 of the wind turbine blade via the attachment part 60. The attachment part 60 comprises a blade wall anchoring part 61 and a bulkhead anchoring part 63, which are connected by an intermediate part 62 or arm. The bulkhead anchoring part 63 is c- or u-shaped so that it comprises a first part 64 attached to the first side 54 of the bulkhead 50, a second part 65 attached to the second side 55 of the bulkhead, and a third part 66 attached to a circumference 56 or edge of the bulkhead 50.

The core material 52 of the bulkhead 50 and the attachment part 60 are advantageously made of a foamed polyurethane (PUR) material. The foamed PUR may be open-celled or closed-celled, and the core material 52 of the bulkhead 50 may be open-celled, and the attachment part 60 closed-celled, or vice versa. PUR is a particular advantageous material to use, since it is versatile and may be provided in various forms. Thereby, the hardness and flexibility of the material may be varied. However, the attachment part may also be made of a rubber or another polymer material exhibiting similar properties. Thus, the attachment part 60 may readily be formed with both an elastomeric part and a non-elastomeric part or a part having less resilience.

In an advantageous embodiment, at least a part of the intermediate part 62 of the attachment part 60 is made of an elastomeric material, e.g. having a hardness of 70 on the Shore A scale, whereas the blade anchoring part 61 and the bulkhead anchoring part 63 may be harder and less resilient. However, in the embodiment shown in FIG. 3, the entire attachment part can be made in the same hardness, since the geometry of the attachment part makes the two anchoring parts stiffer. The elastomeric part of the attachment part 60 ensures easy handling of the bulkhead and attachment part combination 40, when it is mounted in the wind turbine blade. Thus, the flexible attachment part 60 may be folded into the opening of the blade root and adhered to the inner shell wall 25 of the blade. At the same time the attachment part 60 still provides excellent strength to carry the bulkhead 50 and a worker standing on the bulkhead 50. Additionally, the elastomeric part of the attachment part 60 is able to take up forces from the ovalisation of the root. The intermediate part 62 may also have a gradually varying hardness or a stepwise change in hardness so that an inner part of the intermediate arm 62 (i.e. the part nearest the inner shell wall 25) has a lower hardness than that of an outer part of the intermediate arm 62.

In the embodiment shown in FIG. 3, the intermediate part 62 of the attachment part 60 is formed as a straight arm extending between the blade anchoring part 61 and the bulkhead anchoring part 63. The intermediate part forms an angle θ with the inner blade wall 25, advantageously being between 10 and 80 degrees, and more advantageously around 30-40 degrees. Thereby, the embodiment provides a particular simple way of obtaining both a longitudinal displacement between the blade anchoring part 61 and the bulkhead anchoring part 63, and a displacement away from the inner shell wall 25. Thus, the attachment part 60 is able to take up forces from the ovalisation of the root as well as provide the necessary longitudinal or axial strength to carry the bulkhead 50 and a worker standing on the bulkhead 50.

Figure 4:
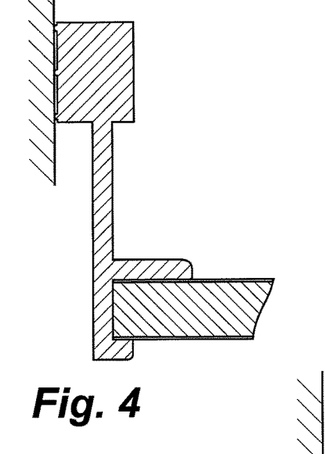
Figure 5:
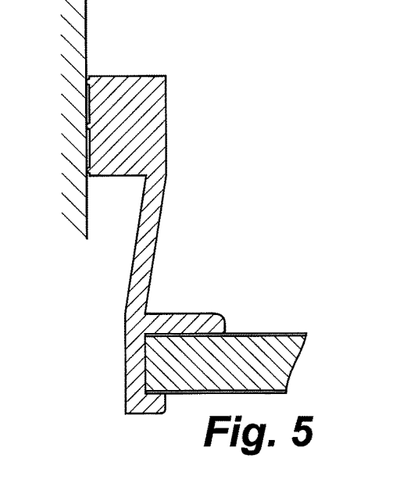
Figure 6:
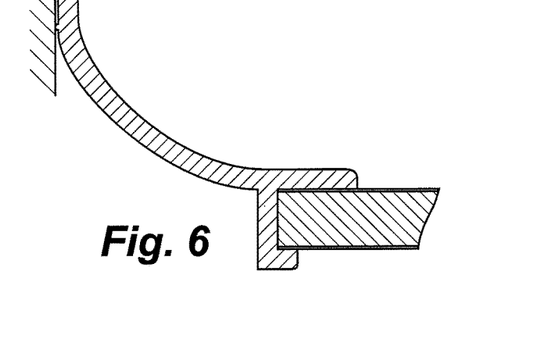
Figure 7:
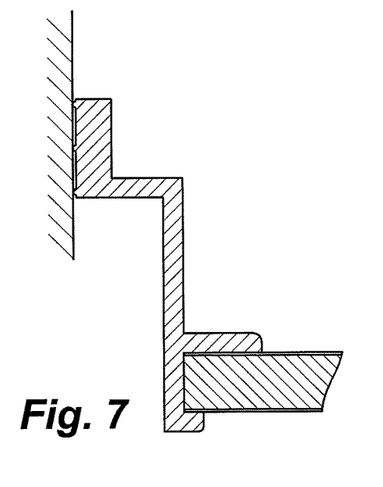

However, the intermediate arm may in principle form any angle with the inner shell wall. Thus, the intermediate part may for instance extend substantially parallel to the inner shell wall with a spacing between the intermediate part and the shell wall as shown in FIG. 4. The attachment part may even as shown in FIG. 5 be formed so that a part of the intermediate part near the blade anchoring part is closer to the blade wall than another part of the intermediate part near the blade wall anchoring part. The intermediate part may also be curved as shown in FIG. 6 or be provided with a bend as shown in FIG. 7.

Figure 8:
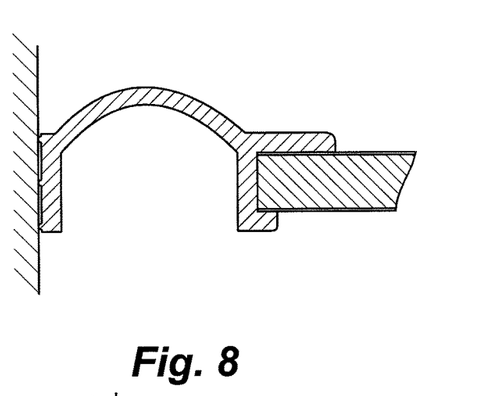

In another embodiment according to the invention shown in FIG. 8, the blade wall anchoring part, the bulkhead anchoring part and the bulkhead are arranged substantially in the same plane. The blade wall anchoring part and the bulkhead anchoring part may be connected by a curved intermediate arm as shown in FIG. 8, or the intermediate arm may extend substantially normally to the inner shell wall.

The embodiments shown in FIGS. 3-8 are all formed with a blade anchoring part, an intermediate part, and a bulkhead anchoring part. However, the attachment part need not comprise an intermediate part as shown in the following embodiments.

Figure 9:
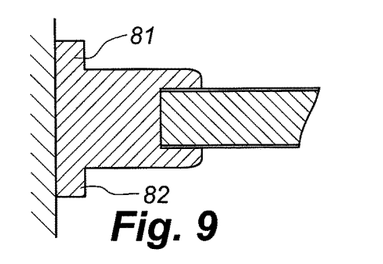
Figure 10:
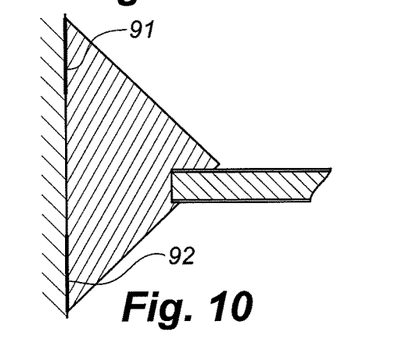

As shown in FIG. 9, the attachment part may be formed as a substantially uniform ring comprising an elastomeric material, e.g. made of a closed-celled foamed PUR material. Thus, the ring is made of an elastomeric material which is able to take up forces from the ovalisation of the root and carry the bulkhead. The attachment part may be formed with or without upper and lower legs 81, 82 as depicted in FIG. 9. The attachment part may also be designed with various shapes, e.g. with a substantially triangular cross-section as shown in FIG. 10. To allow the bulkhead's further movement relative to the blade wall, the attachment part need only be adhered to the blade wall at an upper part 91 and a lower part 92 of the attachment part. The attachment part may be provided with a relatively thin, outer shell having a higher hardness than the foamed PUR material.

Figure 11:
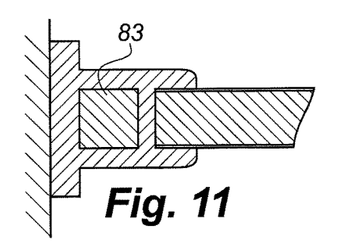
Figure 12:
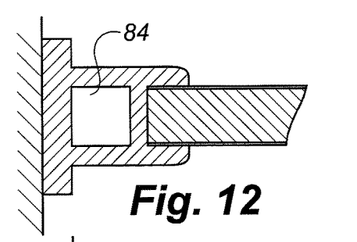

The attachment part may also be formed with a shell and a core part 83 as shown in FIG. 11. The core part 83 may in a first embodiment be made of an open-celled PUR material, which can collapse, thus allowing additional movement of the bulkhead relative to the inner shell wall of the blade. In another embodiment, the core part is made of a material, which is adapted to pulverise or otherwise break apart when subjected to loads, thus forming a hollow part in the attachment part. Thus, the core part is as such only utilised for obtaining a form-stable shape during manufacture (and possibly during mounting) of the bulkhead and attachment part combination. Accordingly, the invention also provides an embodiment having an attachment part comprising a shell with a hollow part as shown in FIG. 12.

Figure 13:
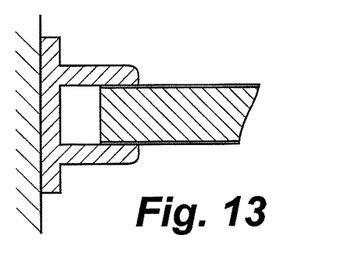
Figure 14:
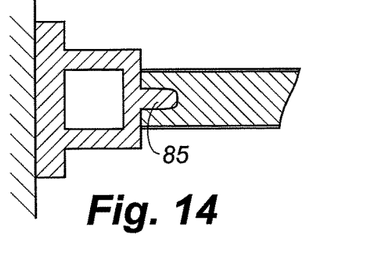

In all the embodiments shown in FIGS. 3-12, the bulkhead anchoring part comprises a third part which is attached to the circumference of the bulkhead. However, the bulkhead anchoring part may as shown in FIG. 13 instead be attached to the first side and the second side of the bulkhead only so that an air gap is formed between the attachment part and the bulkhead, which allows for even further movement of the bulkhead relative to the shell wall of the blade. This may be applied to all the embodiments shown in FIGS. 3-12. In yet another embodiment, the blade anchoring part comprises a tongue 85, which is attached to a groove in the bulkhead as shown in FIG. 14.

Figure 15:
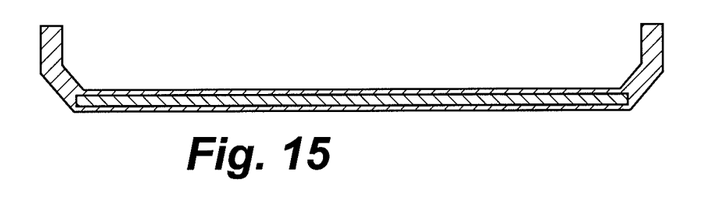
Figure 16:
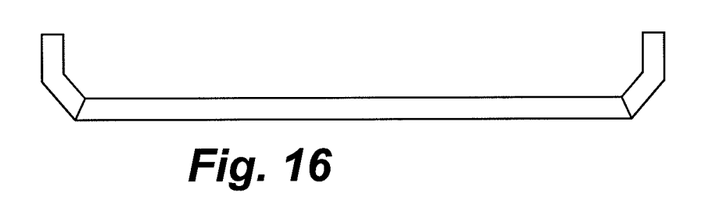

The bulkhead and attachment part may be integrally formed. The bulkhead may for instance be moulded into a PUR cover and with a circumferential attachment part as shown in FIG. 15. This may in practice be carried out by first manufacturing the bulkhead, e.g. as a circular plate, and then arranging it in a separate mould and moulding the PUR cover and attachment part onto the bulkhead. In another advantageous embodiment, reinforcement material, such as glass fibres or carbon fibres, is moulded into a PUR matrix. In yet another embodiment shown in FIG. 16, the bulkhead and attachment part is made in a polymer material only so that the bulkhead is made in a non-elastomeric polymer material, and the attachment part in an elastomeric material. However, in practice this makes the bulkhead and attachment part heavy, and accordingly the bulkhead is typically provided with the aforementioned sandwich construction or fibre reinforcement so that less material is used and the bulkhead can be made lighter.

Figure 17:
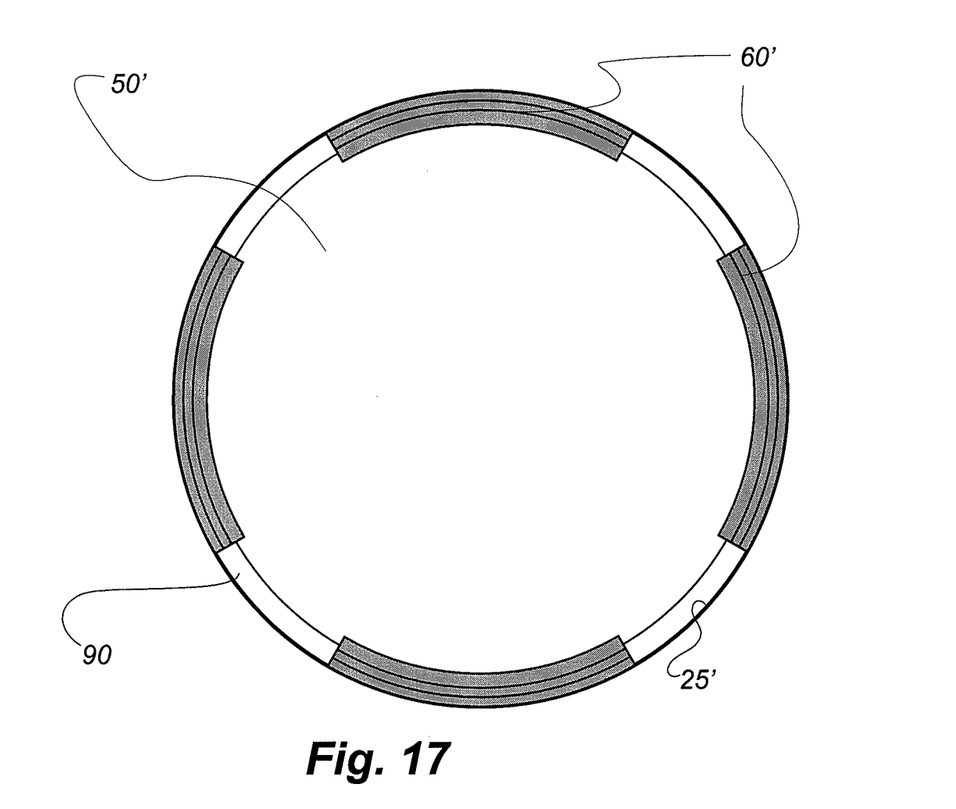

The embodiments shown in FIGS. 3-16 are advantageously formed so that the attachment part extends circumferentially around the bulkhead so that the two parts together seal the root of the blade. However, in another advantageous embodiment, the attachment part consists of a number of separate parts 60', e.g. as shown in FIG. 17. Thus, the modular attachment parts only carry the bulkhead 50' and are individually or combined able to take up forces from the ovalisation of the root. The blade root may be sealed via a separate seal 90, such as a cloth or a separate plate.

According to an advantageous approach, the bulkhead and attachment part combination is manufactured via the following steps. First, a bulkhead plate is moulded as a sandwich construction by first arranging an inner mould between a first layer of glass fibres forming the first skin and a second layer of glass fibres forming the second skin. An outer mould is closed around the glass fibres and the inner mould, after which foam is injected into the inner mould, and finally the sandwich construction is cured or set. If necessary, the shape of the bulkhead is processed, e.g. by cutting, so that the bulkhead fits to the intended blade root. Further, a hole is cut in the plate so as to fit an entry hatch such that the internal of the blade can be accessed, once the bulkhead is mounted in the blade root. Then the attachment part is anchored to the bulkhead. This can be carried out by arranging the processed bulkhead in an additional mould and then moulding the attachment part onto the bulkhead. Alternatively, the attachment part may be moulded separately and subsequently bonded to the bulkhead. Finally, a hatch is mounted in the hole in the bulkhead. This can be carried out by first inserting nuts into the bulkhead, e.g. by pressing them into the plate and then over-laminating them in order to ensure that they are fixed in the bulkhead plate. The hatch can then be mounted in the bulkhead via the nuts. The hatch should be provided with a sealing in order to ensure that the bulkhead is watertight.

LIST OF REFERENCE NUMERALS 2 wind turbine
4 tower
6 nacelle
8 hub
10 blade
14 blade tip
16 blade root
18 leading edge
20 trailing edge
25 inner shell wall/inner blade wall
30 root region
32 transition region
34 airfoil region
36 shoulder
40 bulkhead and attachment part combination
50 bulkhead
51 first outer skin
52 core layer
53 second outer skin
54 first side of bulkhead
55 second side of bulkhead
56 circumference of bulkhead
60 attachment part
61 blade wall anchoring part
62 intermediate part
63 bulkhead anchoring part
64 first part of bulkhead anchoring part
65 second part of bulkhead anchoring part
66 third part of bulkhead anchoring part
81 upper leg
82 lower leg
83 core part
84 hollow part
85 tongue
90 seal
91 upper part of attachment part
92 lower part of attachment part

The invention claimed is:

1. A wind turbine blade (10) having a longitudinal direction (r) with a tip end (16) and a root end (14) and a transverse direction, the wind turbine blade comprising a blade shell defining a profiled contour of the blade and having an inner shell wall (25), wherein
the blade (10) is provided with a bulkhead (50) mounted to the inner shell wall at the root end of the blade via an attachment part (60), the bulkhead (50) comprising a first side (54) and a second side (55), characterised in that
the attachment part (60) is integrally formed with or connected to the bulkhead (50), and in that the attachment part (60) comprises an elastomeric material,
wherein the attachment part (60) comprises a circumferential core part (83), and
wherein the circumferential core part (83) is made of material, which is adapted to pulverise or otherwise break apart when subjected to loads.

2. The wind turbine blade according to claim 1, wherein the attachment part (60) and the bulkhead (50) together seal the root end of the blade (10).

3. The wind turbine blade according to claim 1, wherein an outer diameter of the attachment part (60) is equal to an inner diameter of the inner shell wall (25).

4. The wind turbine blade according to claim 1, wherein the bulkhead (50) comprises a circumference (56), and the attachment part (60) comprises a blade wall anchoring part (61) and a bulkhead anchoring part (63) attached to the circumference (56) of the bulkhead (50).

5. The wind turbine blade according to claim 4, wherein the blade wall anchoring part (61) and the bulkhead anchoring part (63) are separated by an intermediate part (62).

6. The wind turbine blade according to claim 5, wherein the intermediate part (62) is oriented substantially parallel to the longitudinal direction of the blade.

7. The wind turbine blade according to claim 5, wherein the intermediate part (62) is an intermediate arm.

8. The wind turbine blade according to claim 4, wherein the blade wall anchoring part (61), the bulkhead anchoring part (63) and the bulkhead (50) are arranged substantially in the same plane.

9. The wind turbine blade according to claim 4, wherein the blade wall anchoring part (61) is displaced from the bulkhead anchoring part (63).

10. The wind turbine blade according to claim 1, wherein the bulkhead (50) is displaced at least 2 cm from the inner blade wall (25) when the blade is in a non-ovalised state.

11. The wind turbine blade according to claim 10, wherein the bulkhead (50) is displaced at least 4 cm from the inner blade wall (25) when the blade is in a non-ovalised state.

12. The wind turbine blade according to claim 11, wherein the bulkhead (50) is displaced at least 6 cm from the inner blade wall (25) when the blade is in a non-ovalised state.

13. The wind turbine blade according to claim 1, wherein the attachment part (60) comprises a bulkhead anchoring part (63) comprising a substantially c-shaped or u-shaped part having a first part (64) attached to the first side (54) of the bulkhead (50) and a second part (65) attached to the second side (55) of the bulkhead (50).

14. The wind turbine blade according to claim 13, wherein the bulkhead anchoring part (63) further has a third part (66) attached to a circumference (56) of the bulkhead (50).

15. The wind turbine blade according to claim 1, wherein the bulkhead (50) is formed as a sandwich construction, comprising a first fibre reinforced skin (51) at the first side (54) of the bulkhead (50), a second fibre reinforced skin (53) at the second side (55) of the bulkhead (50) and a core material (52) between the first skin (51) and the second skin (53).

16. The wind turbine blade according to claim 15, wherein the core material (52) is made of a polymer material.

17. The wind turbine blade according to claim 16, wherein the elastomeric material of the attachment part (60) and the polymer material of the bulkhead (50) are compatible.

18. The wind turbine blade according to claim 16, wherein the polymer material is a foamed polymer.

19. The wind turbine blade according to claim 18, wherein the elastomeric material and the foamed polymer are a polyurethane based material.

20. The wind turbine blade according to claim 1, wherein the attachment part (60) comprises the elastomeric material and a non-elastomeric part.

21. The wind turbine blade according to claim 20, wherein the elastomeric part of the blade is attached to the inner shell wall (25), and the non-elastomeric part is attached to the bulkhead (50).

22. The wind turbine blade according to claim 20, wherein the attachment part (60) comprises a gradual transition from an elastomeric material to a non-elastomeric material.

23. The wind turbine blade according to claim 20, wherein the elastomeric material and the non-elastomeric part are made of polyurethane.

24. The wind turbine blade according to claim 1, wherein the attachment part comprises a substantially uniform ring having a thickness of at least 5 cm.

25. The wind turbine blade according to claim 24, wherein the attachment part comprises a substantially uniform ring having a thickness of at least 7 cm.

26. The wind turbine blade according to claim 25, wherein the attachment part comprises a substantially uniform ring having a thickness of at least 10 cm.

27. The wind turbine blade according to claim 1, wherein the elastomeric material has a durometer value lying in an interval from 50-100 on the Shore A scale.

28. The wind turbine blade according to claim 27, wherein the elastomeric material has a durometer value lying in an interval from 50-90 on the Shore A scale.

29. The wind turbine blade according to claim 28, wherein the elastomeric material has a durometer value lying in an interval from 55-85 on the Shore A scale.

30. The wind turbine blade according to claim 1, wherein the attachment part (60) consists of a number of separate parts (60').

31. The wind turbine according to claim 30, wherein the root end of the blade is sealed via a separate seal (90).

32. The wind turbine blade according to claim 1, wherein the elastomeric material has a durometer value lying in an interval from 10-50 on the Shore D scale.

33. The wind turbine blade according to claim 32, wherein the elastomeric material has a durometer value lying in an interval from 12-40 on the Shore D scale.

34. The wind turbine blade according to claim 33, wherein the elastomeric material has a durometer value lying in an interval from 15-30 on the Shore D scale.

35. A method of manufacturing a bulkhead and attachment part, wherein the method comprises the steps of:
 a) manufacturing a bulkhead,
 b) manufacturing an attachment part comprising an elastomeric material, and
 c) anchoring the attachment part to the bulkhead,
 wherein the attachment part comprises a circumferential core part, and
 wherein the circumferential core part is made of material, which is adapted to pulverise or otherwise break apart when subjected to loads.

36. The method according to claim 35, wherein the bulkhead and attachment part are integrally formed.

37. The method according to claim 35, wherein the attachment part is moulded on to the bulkhead.

38. The method according to claim 37, wherein the bulkhead is first shaped and then arranged in a mould so as to mould the attachment part on to the bulkhead.

39. The method according to claim 35, wherein the bulkhead is manufactured as a sandwich construction comprising a core material made of a polymer material.

40. The method according to claim 39, wherein the elastomeric material of the attachment part and the core material of the bulkhead are compatible.

41. The method according to claim 39, wherein the elastomeric material of the attachment part and the core material of the bulkhead are chemically compatible.

42. The method according to claim 35, wherein the attachment part is moulded on to a circumference of the bulkhead.

\* \* \* \* \*